Figure 1:
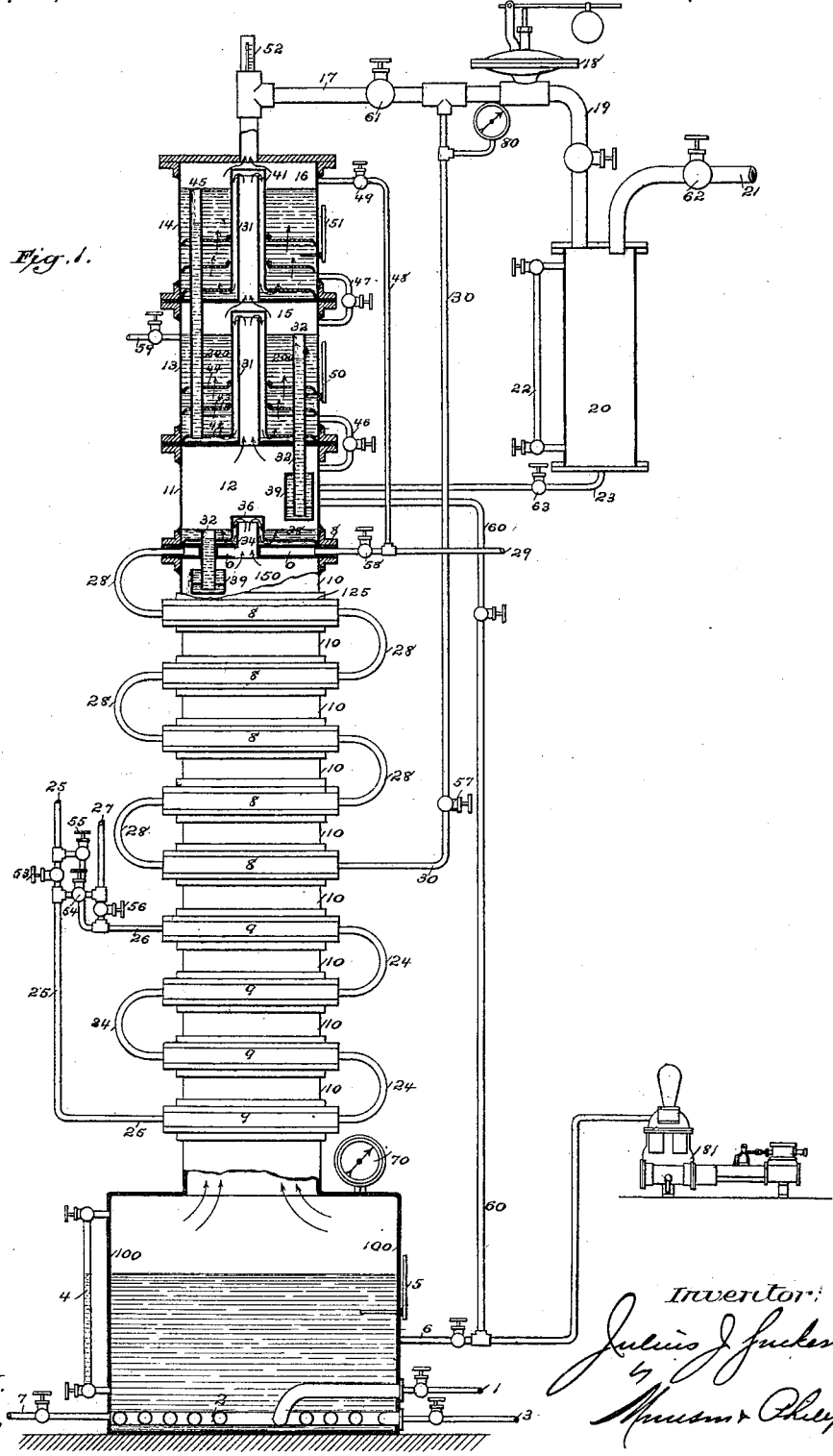

(No Model.)

J. J. SUCKERT.

METHOD OF AND APPARATUS FOR SEPARATING A LIQUEFIABLE GAS FROM A CONDENSABLE VAPOR.

No. 320,310. Patented June 16, 1885.

(No Model.) 2 Sheets—Sheet 2.

J. J. SUCKERT.
METHOD OF AND APPARATUS FOR SEPARATING A LIQUEFIABLE GAS FROM A CONDENSABLE VAPOR.

No. 320,310. Patented June 16, 1885.

UNITED STATES PATENT OFFICE.

JULIUS J. SUCKERT, OF RIDGEWOOD, NEW JERSEY.

METHOD OF AND APPARATUS FOR SEPARATING A LIQUEFIABLE GAS FROM A CONDENSABLE VAPOR.

SPECIFICATION forming part of Letters Patent No. 320,310, dated June 16, 1885.

Application filed March 25, 1885. (No model.)

*To all whom it may concern:*

Be it known that I, JULIUS J. SUCKERT, a citizen of the United States, residing at the town of Ridgewood, county of Bergen, and State of New Jersey, have invented certain new and useful Improvements in Method of and Apparatus for Separating a Liquefiable Gas from a Condensable Vapor, fully described and represented in the following specification and the accompanying drawings, forming a part of the the same.

This process relates to the dehydration of all liquefiable gases, but principally to those which do not form solid hydrates with water—such as ammonia, methylamine, carbonic acid, nitrous oxide, &c.

Hitherto in the majority of methods applied for drying liquefiable gases and rendering their volatile liquids anhydrous, various compounds have been used—such as oil of vitriol, chloride of calcium, chloride of magnesium, caustic lime, caustic potassa, &c.—depending upon the chemical affinity of the gas with which they were to be brought in contact; but the results obtained with such media were neither positive nor successful when applied to the manufacture or the drying of large quantities of liquefiable gas, as they either absorb and retain large quantities of the gas, and, having to be frequently renewed, cause excessive loss by the removal and waste of the gas retained, or they act but imperfectly as driers and only extract a percentage of the moisture. For instance, some liquefiable gases have a greater affinity for water than the drying media, and when the percentage of moisture in the gas has been reduced to a certain degree the ordinary drying agents are incapable of depriving the gas of the remaining moisture. As the majority of liquefiable gases are manufactured commercially for subsequent vaporization, reliquefaction, and use in refrigerating apparatus, it is of prime importance in this technical application of the gas that it should be free from moisture, that it may completely evaporate, and not leave a residuum of water saturated with the gas within the cooling or heat-absorbing coils. Such occupation of space in the coils not only excludes an equal volume of liquefied gas, but renders it necessary to reduce the suction-pressure of the apparatus to obtain the same temperature within the coils that would exist if an anhydrous liquefied gas were used, or a gas which would completely vaporize at the temperature existing within the coils without depositing moisture. This reduction in the suction or "back-pressure" of the apparatus means less weight of gas compressed per stroke of the compressor, if such be used, or less weight of gas absorbed in the weak liquor fed to the absorber in case an absorption machine is used. In either case the presence of moisture will decrease the performance of the apparatus and require in one instance more revolutions; in the other, more weak liquor to perform the same work that could be performed with an anhydrous liquefied gas. By maintaining a higher back-pressure a greater weight of gas can be compressed or absorbed than can be under a lower back-pressure. The presence of moisture is a still greater detriment if air is present in the apparatus, as their combined action tends to oxidize some of the liquefiable gases and form acids, which eventually corrode and destroy the metal surfaces with which they come in contact. Therefore to utilize the refrigerating capacity of liquefied gases to the fullest extent, and to obtain the most efficient results with the apparatus used for purposes of refrigeration, it is essential that the gases employed for the purpose should be strictly anhydrous.

The object of this invention is to provide a means for the manufacture of anhydrous gases, and to obviate the difficulties hitherto encountered in the use of gases containing moisture; to dispense with all chemical driers or absorbents of moisture and the labor and waste incidental to their use; to obtain an anhydrous liquefied gas which will evaporate at any desired temperature above its congealing-point without leaving a residuum; to utilize a liquefied gas as a means of purifying and rendering moist gas anhydrous; to separate all condensable vapors and gases from the liquefiable gas prior to its liquefaction when the liquids of the vapors or gases have higher boiling-points than the liquefied gas; to enable the operator simply by regulating the pressure to render the gas to be liquefied more or less anhydrous, as he may desire; to make the process continuous, automatic, and positive in its action and easy of regulation; by a system of fractional distillation to make the process economical in its application.

To this end the invention consists, first, of the process of separating a liquefiable gas from a condensable vapor, which process consists in first reducing the temperature of a solution of the gas by the vaporization of a liquefied gas, and then passing the liquefiable gas and intermingled vapor through such cooled solution, thereby liquefying and separating the vapor, or a part thereof, and then cooling the liquefiable gas, and liquefying and separating the remaining condensable vapor by bringing it in direct contact with a liquefied gas exposed at a reduced pressure, as will hereinafter appear.

Second, the invention further consists of the process of separating a liquefiable gas from a condensable vapor, which process consists in first reducing the temperature of a solution of the gas by the vaporization of a liquefied gas, and then passing the liquefiable gas and intermingled vapor through such cooled solution, thereby liquefying the vapor and separating it from the gas, as will hereinafter appear.

Third, the invention further consists of the process of separating a liquefiable gas from a condensable vapor, which process consists in first exposing a liquefied gas at a reduced pressure, and then bringing a liquefiable gas and intermingled vapor in direct contact therewith, thereby liquefying such vapor and separating it from the liquefiable gas, as will hereinafter appear.

Fourth, the invention further consists of the various combinations of parts shown or described in this application.

Figure 2:
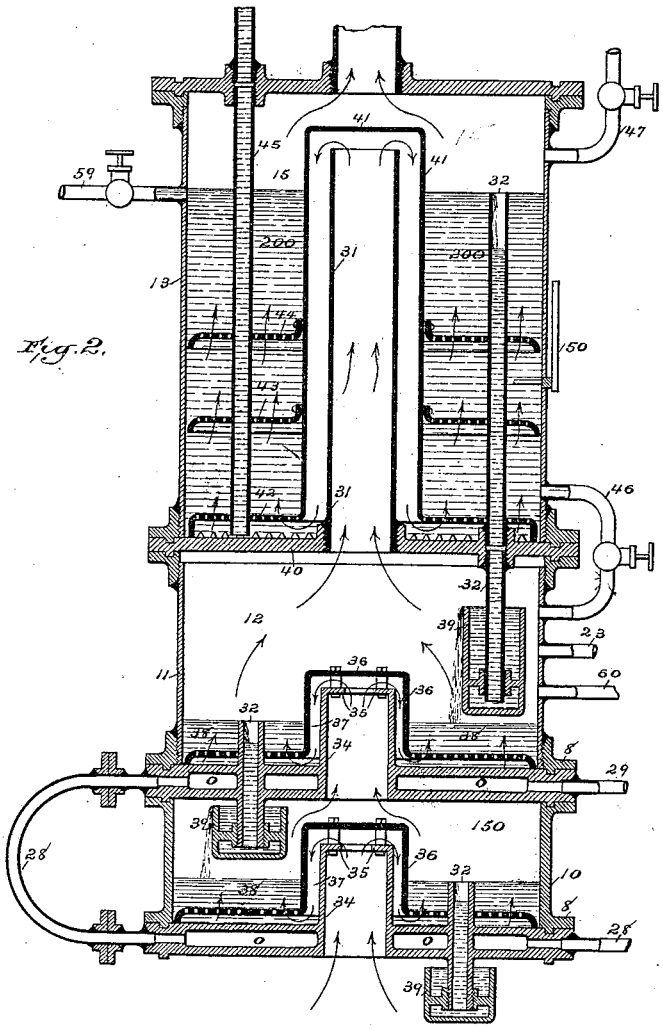

At Figure 1 one practical embodiment of the invention is shown in elevation, and partly in section, as used with a means for compressing and liquefying gases. Fig. 2 is an enlarged sectional view of a portion of the upper part of the tower shown in Fig. 1.

In Fig. 1 a still or boiler, 100, represents a means of generating the gas from a solution of the gas by the application of heat. Gas may be produced by other means, and the system and tower will be applicable for separating it from an aqueous or other vapor without regard to the manner of its generation. The steam-pipe 1 leads the live steam to coil 2, which is submerged in the solution contained in the still. The outlet 3 from the steam-coil is provided for carrying off the condensed water. It is preferably connected with a steam-trap. (Not shown in the drawings.) The still 100 has a glass gage, 4, for determining the height of the liquid therein, with a thermometer, 5, for determining the boiling-point of the contents of the still, and with a pressure-gage, 10, to indicate the pressure in the still.

For feeding the solution of gas in water or other liquid to the still a pipe, 6, is provided, and for discharging the water or other liquid contained in the still after the gas has been expelled therefrom a pipe, 7, is used. The still 100 communicates with a column, 125, formed by joining and bolting together the hollow distilling-plates 8 8 and 9 9 with the flanged rings or tubes 10 10 10, which form the separating, condensing, and distilling chambers. On the top of the column 125, a longer flanged tube, 11, is bolted, forming the chamber 12, and above this the flanged tubes 13 and 14 form, respectively, the chambers 15 and 16. The chamber 16 forms the top chamber of the column, and communicates by means of the pipe 17 with the pressure-regulator 18, and by means of the pipe 19 with the receptacle 20, which is provided with an escape-pipe, 21, which is the suction-pipe leading to a gas compressing and liquefying apparatus. (Not shown in the drawings.) Any compression machine provided with ample condensing-surface will answer. The receptacle 20 is provided with a glass gage, 22, and with a discharge-pipe, 23, connecting with the chamber 12 above the column of distilling-plates and rings 125. The chambers formed in the hollow plates 9 9 communicate by means of the bent pipes 24 24, and the chamber of the lowest of these plates with the pipe 25, and the uppermost plate-chamber with the pipes 26 and 27. The chambers within the upper plates 8 8 communicate by means of the bent pipes 28 28 28. The uppermost plate-chamber is connected with the liquefied-gas pipe 29, and the chamber of the lowest plate of this series with the pipe 30, which connects with the pipe 17. The chamber 12 communicates with the chamber 15 by the tubes 31 and 32, and the chamber 15 with the chamber 16 by tubes 31 and 45, as will hereinafter be explained. The hollow plates 8 and 9 are alike, and are so constructed that their interior chambers do not communicate with the interior of the column, but the chambers formed by the flanged tubes 10 10 10, interposed between the plates 8 and 9, do communicate with each other, as will be explained by reference to Fig. 2, in which 8 8 are the hollow chambered distilling-plates, the chambers communicating by means of the bent tubes 28. These plates are cast with a central tube, 34, open at both ends, but provided at the upper end with small projections 35, upon which the flanged hood 36 rests, and is so adjusted that an open space, 37, exists between the top of the hood and its sides and the central tube, 34. The flange 38, extending around this hood, forming its rim, is supplied with a large number of perforations. The chambers of the distilling-plates 8 8 are also intersected at one side by the open tubes 32, which do not communicate with the interior chamber of the plates, but do communicate with the chambers formed between the plates 8 8 by the flanged tubes or rings 10 10 10. The tubes 32 are supplied with cups 39, attached to their bottom ends, which act as traps when filled with a liquid. The chamber 12 communicates with the chamber 15 through the central tube 31, which is screwed into the plate 40, forming the top of the chamber 12. The tube 31 is covered in chamber 15 by the tube 41, closed at the upper end and open at its lower end, which is supplied with the perforated flange or rim 42. The tube 41 is also supplied with two additional perforated flanges, 43 and 44, fastened to the outside of the tube, above the flange 42, and extending, like the flange 42, to the tube 13, forming the side walls of the chamber 15. Communication is also established between chambers 12 and 15 by means of the open tube 32, supplied at its bottom end with the cup or trap 39. Chambers 15 and 16 communicate in similar manner to chambers 12 and 15, with the exception that the pipe 45, which answers the same purpose as pipe 32 between chambers 15 and 12, is not supplied with a trap similar to trap 39 on pipe 32 in chamber 12. Communication can also be established between chambers 15 and 12 by opening the valve on pipe 46, or between 15 and 16 by opening the valve on pipe 47, which is only necessary when the liquefied gas becomes diluted with the condensed vapor and it is desirable to replace it with pure liquefied gas. The chamber 16, Fig. 1, communicates with the liquefied-gas pipe 29 by means of the pipe 48 and the valve 49. Attached to and entering the chambers 15 and 16 are the thermometers 50 and 51. The pipe 17, leading from the chamber 16, is also supplied with a thermometer, 52. 80 is a pressure-gage to indicate the pressure of the liquefiable gas in pipes 17 and 30. 81 is a common force-pump used to introduce the solution of the gas to the still through pipe 6, or to the chamber 12 at the top of the tower through the pipe 60, for trapping the tubes 34 and overflow-tubes 32 prior to starting the apparatus in case it is necessary to start up quickly. Having withdrawn the air from the apparatus through the pipe 21 by starting the compressor, the still 100 is then charged with a solution of liquefiable gas. (Indicated by the shading.) The pressure-regulating valve 18 is so adjusted that a constant pressure will be maintained within the apparatus, and to remain constant it must always be in excess of the pressure in the pipe 21. Steam is then turned into the coil 2 by opening the steam-valve on the steam-pipe 1. The valves 53 and 56 on the water-pipe 25 are then opened and the valves 54 and 55 closed. The water flowing from 25 fills the interior chamber in the lowest plate 9 of the column, passes through the pipe 24 to the next plate, and so on through all the plates 9 9, until it passes through the overflow-pipes 26 and 27. It is allowed to run a few minutes until all the air contained in the chambers and connecting-pipes is displaced by water, when the water-current is reversed, so that the coldest water enters the uppermost one of the plates 9 and the warm water leaves the lowest plate in the column. This is accomplished by closing the valves 53 and 56 and opening the valves 54 and 55, when the cold water will enter the pipe 26, and the warm water will be discharged through pipe 25, valve 54, and overflow 27. The valve 57 on pipe 30 is now opened wide, and the valve 58 on pipe 29 gradually opened, to allow liquefied gas to flow into the interior chambers of the hollow distilling-plates 8 8 8. Depending upon the pressure at which the regulating-valve 18 is set, the temperature of these plates can be regulated to any desired degree, limited only by the boiling-point of the liquefied gas introduced. The valves in pipes 46 and 47 are now closed and the valve 49 in pipe 48 opened. The liquefied gas is thereby allowed to enter chamber 16 to fill this chamber to the top of pipe 45, and to overflow through pipe 45 into and fill chamber 15 to the top of pipe 32. The height of the liquid therein can be determined by the line of frost on the tube 13, or by slightly opening the small valve 59. The valve 49 is then almost closed, and but a slight quantity of liquefied gas allowed to enter chamber 16, any excess overflowing to chamber 15 through the pipe 45. When 15 is filled, the surplus passes through the overflow-pipe 32 and fills the trap 39, and thence falls upon the surface of the uppermost plate, 8. The gas intermingled with aqueous or other vapor passes from the still or generator 100 into the column 125, where it meets the plates 9 9, which in this case are cooled by the circulation of water through their inclosed chambers 0, the water entering in through pipe 26 and leaving the lowest plate through pipe 25. In many cases the water is entirely dispensed with, and the plates are all cooled by the vaporization of a liquefied gas. This is effected by removing the water-pipes, disconnecting the pipe 30 from the lowest plate 8 and connecting it on the same side with the lowest plate 9, and connecting the plates 9 with the plates 8 by the bent pipes 28. In the same manner the plates 8 are connected with each other. This will continue the circulation of the vaporizing liquefied gas through all the plates in the tower, and reduce the temperature to a lower degree than can be attained with water. The aqueous or other vapor separates in part upon these plates, and the partially-dried gas ascending further into the column meets the plates 8 8, which are cooled by the vaporization of the liquefied gas therein, and again deposits moisture on these plates, and finally entering chamber 12, passing thence through the liquefied gas contained in chamber 15, and vaporizing a portion of that, the vaporized part intermingling with the dried or partially-dried gas then passes through the liquefied gas in chamber 16, again vaporizing a quantity of the liquefied gas contained in the chamber. The gas and vaporized gas then enters the pipe 17, and there encounters the vaporized gas from the interior chambers of the plates 8 8 and 9 9. If the system of gas-circulation be extended to the plates 9 9, conducted to the pipe 17 by the pipe 30, the combined gases are conveyed past the regulating-valve 18 to the receptacle 20, and thence through the suction-pipe 21 to a gas compressing and liquefying apparatus. (Not shown in the drawings.) In a short period of time the plates 9 9 and 8 8 are covered with a liquid consisting of solutions of the gas in water or other liquid of varying strengths, depending entirely upon the difference in the pressure and temperature to which the liquid on each plate is exposed. Commencing at the lowest plate 9 and advancing upward in the column, the percentage of gas present in the liquid covering the plates will be gradually increased until it finally represents on the uppermost plates a liquefied gas containing but a small percentage of water. As the process of separating the aqueous or other vapor from the gas continues, the liquid covering the various plates increases in quantity until it reaches the top of the overflow-pipes 32, fills the traps 39, and flows onto the plate next below. A period is therefore reached when all the plates are properly covered with liquid and the traps 39 filled. When this occurs, the apparatus can be considered in working order. As previously stated, it can be prepared for work more promptly by pumping a solution of gas through the pipe 60 into the chamber 12, and then allowing it to flow from plate to plate in its descent until all are covered and the traps filled.

The plates having condensed and liquefied sufficient vapor to properly cover them and to fill the traps 39, the operation of the apparatus is as follows: The warm gas, intermingled with aqueous or other vapor, passes from the still 100 to the first plate 9 in the column, and enters the central tube, 34. (More clearly shown in Fig. 2.) It then passes from the tube 34 into the annular space 37, formed by the hood 36, and thence through the perforations in the plate 38 into the body of the liquid covering this plate, whereby it is thoroughly washed and deprived of what moisture or vapor the liquid will condense. After passing through the liquid it enters the chamber 150, and thence again passes into the central tube, 34, of the next plate above, and so continues in its washing and passage from plate to plate until it reaches chamber 12, when it passes into tube 31, thence in a downward direction, as indicated by the arrows, into the annular space formed between tube 31 and hood 41, and then passes into the liquefied gas 200 through the perforations in the flange 42. In its upward passage through the liquefied gas it is next intercepted and subdivided by the perforated flange 43, and again intercepted and subdivided by its passage through the perforated flange 44. After passing through the liquefied gas it escapes into the open part of chamber 15, whence it again passes through a central tube, 31, Fig. 1, and in a similar manner through the liquefied gas contained in the uppermost chamber, 16. It leaves this chamber deprived of what aqueous or other condensable vapor it may have originally contained and intermingled with the gas vaporized in reducing its temperature and condensing or liquefying the vapor impurities. The intermingled gases pass through the pipes 17 and 19 into the tank or receptacle 20, in which any subdivided particles of liquefied gas mechanically drawn from the chamber 16 can separate. The purified gas is then drawn through pipe 21 to the means employed for the compression and liquefaction of such gas. In case any liquid should accumulate in receptacle 20 it can be discharged therefrom by closing the valves 61 and 62, opening the valve 63, and allowing the pressure developed by the liquefied gas vaporized in the chambers of the plates 8 to pass through pipe 30 into 17, thence into receptacle 20, and force the liquid contained in the receptacle 20 through the pipe 23 into the chamber 12 of the column. The valve 63 on pipe 23 is then closed, the valve 62 opened, and then 61, when the normal working conditions will again be resumed. Any aqueous or other vapor condensing in the liquefied gas in chamber 16, Fig. 1, together with what liquefied gas may be allowed to enter this chamber past the valve 49, increases the bulk of liquid in this chamber and causes it to overflow through pipe 45 into the chamber 15, and this surplus, together with the vapors condensed in the liquefied gas in this chamber, causes an overflow into the pipe 32, thence through the trap 39 into the chamber 12. The liquid accumulating on the plate 8 in chamber 12 overflows through the pipe 32 into trap 39, and thence on the next plate below, forming the bottom of chamber 150. It continues thus in its downward passage through the remaining plates and chambers, the overflow increasing in quantity and growing warmer as it descends by constantly meeting a current of warmer gas, until it is finally discharged into the still 100. The warm gas, on the contrary, as it ascends, constantly meets colder liquid, and thereby continues to part with what moisture, aqueous or other liquefiable vapors it may contain, until it is eventually discharged from the top of the column thoroughly washed and deprived of the separable vapors. It will be observed that the vapors or gases passing into chambers 15 and 16 are cooled and washed by direct contact with a liquefied gas, and that from chamber 12 to the uppermost plate marked 9 a gas in its upward passage and the solution of the gas in its downward passage are indirectly cooled by the vaporization of a liquefied gas within the inclosed chambers 8, which surround the apertures through which the gas vapor or solution passes. In plate 9 an indirect system of cooling the gas or vapor by cold water, as a substitute for the use of liquefied gas, as used in plates 8, is employed in some cases as a means of economy. When the liquid in the still 100 has been well heated, (which can be determined by the thermometer 5,) and deprived of what gas it contains, the valve on the pipe 7 is opened and the weak liquor discharged, cooled, and recharged with gas or allowed to run to waste, and a new charge is gradually introduced through the pipe 6 by means of the pump 81, and the operation continued. The process can be made continuous by closing the valve on pipe 6, opening the valve on pipe 60, and continually forcing a solution of the gas through pipe 60 into chamber 12 by the pump 81, and continually withdrawing the exhausted liquor through the discharge-pipe 7. In case this is carried out additional plates are introduced between the lowest plate 9 and the still 100. It will be further observed that the process admits of manufacturing a liquefied gas that will evaporate at any temperature above its solidifying-point without leaving a residuum. For instance, if it be desirable to manufacture liquefied ammonia gas for refrigerating purposes which will entirely vaporize at 0° Fahrenheit, we know by referring to Regnault's tables that 0° Fahrenheit represents a pressure of about fifteen pounds above the atmosphere. Therefore, if we maintain fifteen pounds above the atmosphere in the pipe 17, we can feel confident that the liquefied ammonia introduced in chamber 16 will have a temperature of 0° Fahrenheit; but as the condensation and intermixture of aqueous or other vapors increases the boiling-point of the liquefied gas, I find it necessary in practice to maintain the temperature within the chamber 16 at a lower degree than 0° Fahrenheit. Therefore the regulating-valve 18 is set to open at, say, five pounds pressure above the atmosphere, which will correspond to a temperature of about −16° Fahrenheit if pure liquefied ammonia is in the chamber 16; but by observing the thermometers 50, 51, and 52 we can ascertain exactly what pressure it is necessary to maintain, and we can vary this pressure according to the boiling-points of the liquefied gas within the chambers 16 and 15. It is therefore apparent that all the gas before leaving the apparatus can be thoroughly washed by its own volatile liquid at a temperature corresponding to the pressure to which the volatile liquid is exposed, and the gas can thereby be completely freed and separated from any condensable vapors which will liquefy at this temperature. Furthermore, no foreign drying agents are required, and consequently no loss can ensue by the absorption of gas thereby, and the entire labor of handling such agent is dispensed with. The process is automatic, and enables the operator, by an examination of the thermometer and the regulation of the pressure, to dry and purify the gas to any extent he may desire.

Very large quantities of anhydrous liquefied ammonia have already been manufactured by me, using the indirect system of cooling, as explained in the action of the plates 8 8 and 9 9, the washing-liquid being cooled indirectly by the contact of liquefied gas with the plates. Better results are obtained than with the use of the ordinary drying agents; but they are not as good as can be produced by a combination of the direct and indirect system, as described in this process.

The process as shown in this apparatus is applicable to the washing and cooling of a gas and the separation therefrom of liquefiable vapors by the vaporization of a liquefied gas in indirect contact with the washing-liquid, or by direct contact or washing of the gas with its own volatile liquid maintained at a temperature slightly in excess of the liquefying temperature of the gas being washed. The process is also applicable to absorption refrigerating-machines in depriving the gas from aqueous vapor prior to its liquefaction by washing it with its own volatile liquid or a solution thereof.

Having fully described my invention, what I claim as new, and desire to secure by Letters Patent of the United States, is—

1. The process of separating a liquefiable gas from a condensable vapor, which process consists in first reducing the temperature of a solution of the gas by the vaporization of a liquefied gas, and then passing the liquefiable gas and intermingled vapor through such cooled solution, thereby liquefying and separating the vapor, or a part thereof, and then cooling the liquefiable gas and liquefying and separating the remaining condensable vapor by bringing it in direct contact with a liquefied gas exposed at a reduced pressure, substantially as described.

2. The process of separating a liquefiable gas from a condensable vapor, which process consists in first reducing the temperature of a solution of the gas by the vaporization of a liquefied gas, and then passing the liquefiable gas and intermingled vapor through such cooled solution, thereby liquefying the vapor and separating it from the gas, substantially as described.

3. The process of separating a liquefiable gas from a condensable vapor, which process consists in first exposing a liquefied gas at a reduced pressure, and then bringing a liquefiable gas and intermingled vapor in direct contact therewith, thereby liquefying such vapor and separating it from the liquefiable gas, substantially as described.

4. The combination, with a still or gas-generator, of a series of distilling-chambers communicating one with another by a conduit arranged to trap a gas or vapor passing through it, a second series of chambers, also communicating one with another by conduits and separated from the first series by walls or partitions, which are supplied with a cooling medium operating to reduce the temperature of a gas or vapor in transit to or through the distilling-chambers, substantially as described.

5. The combination, with a still or gas-generator, of a series of communicating separating-chambers which are supplied with a liquid, and are provided with a conduit arranged to introduce a gas or vapor passing through said conduit into such liquid, when the said liquid is reduced in temperature by a cooling medium in another chamber, and operates to wash, cool, and separate a gas from a vapor, substantially as described.

6. The combination, with a still or gas-generator, of a series of chambers placed in line vertically, and communicating one with another by a conduit having its outlet sealed with a liquid and operating to trap a gas or vapor passing through such conduit, when the said liquid, gas, and vapor are cooled by a cooling medium in another chamber, and the cooled liquid operates to wash a gas and separate it from a vapor, substantially as described.

7. The combination, with a still or gas-generator, of a series of chambers which are supplied with a liquid, and communicate one with another by a conduit arranged to introduce the gas or vapor passing through such conduit into and through such liquid, when the said chambers are also provided with a liquid-sealed conduit operating as an overflow to convey a liquid from one chamber to another, and the liquid through which the gas or vapor passes is reduced in temperature by a cooling agent or medium not in direct contact with such liquid, substantially as described.

8. The combination, with a still or gas-generator, of a series of chambers supplied with a liquid, which communicate one with another by a conduit arranged to introduce the gas or vapor passing through such conduit into and through such liquid, a series of cooling-chambers, also connected by conduits, a reservoir of liquefied gas, and connecting-pipes, when the whole is connected, arranged, and operates to cool the gas, vapor, and liquid by the vaporization of a liquefied gas in the said cooling-chambers, substantially as described.

9. The combination, with a still or gas-generator, of a series of chambers containing a liquid, which chambers communicate one with another by a conduit arranged to introduce the gas or vapor passing through such conduit into and through such liquid, and the said chambers are also provided with a liquid-sealed conduit operating as an overflow to convey a liquid from one chamber to another, a series of cooling-chambers, also connected by conduits, through which a refrigerating agent circulates, a reservoir of liquefied gas, and connecting-pipes, when the whole is connected, arranged, and operates to cool the gas, vapor, and liquid by the vaporization of a liquefied gas in the said cooling-chambers, substantially as described.

10. The combination, with a still or generator, of a gas drying and separating tower, consisting of a series of separating-chambers supplied with a liquid, and which are interposed between a series of hollow condensing-plates, but communicate one with another by liquid-sealed conduits through which gas or vapor passes, when the hollow condensing-plates also connect by conduits one with another and with a reservoir of liquefied gas, and the whole is constructed, arranged, and operating to separate a gas from a vapor by forcing the gas or vapor through a liquid in the separating-chambers that is cooled by the vaporization of a liquefied gas in the said condensing-plates, substantially as described.

11. The combination, with a still or generator, of a gas drying and separating tower, consisting of a series of separating-chambers supplied with a liquid, and which are interposed between a series of hollow condensing-plates, but communicate one with another by liquid-sealed conduits through which gas or vapor passes, when the hollow condensing-plates also connect by conduits one with another and with a reservoir of liquefied gas, and the whole is constructed, arranged, and operating to separate a gas from a vapor by cooling such gas or vapor in its passage through the tower or the conduits of the separating-chambers by the vaporization of a liquefied gas not in direct contact with the gas or vapor being cooled, substantially as described.

12. The combination, with a still or gas-generator, of a condensing or separating chamber provided with a liquid-sealed conduit through which it receives gas or vapor, and a liquid-sealed conduit arranged to discharge accumulating liquid to another chamber, when the said separating or condensing chamber is also provided with an outlet or escape for gas or vapor, and the chamber and its contents are cooled or reduced in temperature by the vaporization of a liquefied gas in conduits or passages that separate such gas from the contents of the said chamber, substantially as described.

13. The combination, with a still or gas-generator, of a condensing or separating chamber provided with a liquid-sealed conduit through which it receives gas or vapor, a liquid-sealed conduit arranged to discharge accumulating liquid to another chamber, and an outlet or escape for gas or vapor, when the said condensing or separating chamber is cooled or reduced in temperature by a cooling medium that has been reduced in temperature, and is circulated in conduits or passages that separate such cooling medium from the contents of the condensing or separating chamber, substantially as described.

14. The combination, with a still or gas-generator, of a condensing or separating chamber provided with a liquid-sealed conduit through which it receives gas or vapor, a liquid-sealed conduit arranged to discharge accumulating liquid to another chamber, and an outlet or escape for gas or vapor, when the said separating or condensing chamber is provided with liquefied gas, and the whole is arranged and operating to condense a gas or vapor or to dry a gas by its direct contact with a liquefied gas, substantially as described.

15. The combination, with a still or gas-generator, of a condensing or separating chamber provided with a liquid-sealed conduit through which it receives gas or vapor, a liquid-sealed conduit arranged to discharge accumulating liquid to another chamber, and an outlet or escape for gas or vapor, when the said chamber is provided with a liquefied gas and one or more perforated retarding, separating, or condensing plates, and the whole is arranged and operating to condense a gas or vapor or to dry a gas by its direct contact with a liquefied gas, substantially as described.

16. A still or gas-generator, a condensing or separating chamber provided with a liquid-sealed conduit through which it receives gas or vapor, a liquid-sealed conduit arranged to discharge accumulating liquid to another chamber, and an outlet or escape for gas or vapor, when the said condensing or separating chamber and its contents are cooled or reduced in temperature by a cooling medium that has been reduced in temperature, and is circulated in conduits or passages that separate such cooling medium from the contents of the condensing or separating chamber, in combination with one or more condensing or separating chambers that are provided with liquefied gas operating to condense a gas or vapor or to dry a gas by its direct contact with the liquefied gas, substantially as described.

In testimony whereof I have hereunto set my hand in the presence of two subscribing witnesses.

JULIUS J. SUCKERT.

Witnesses:
H. T. MUNSON,
T. H. PALMER.